United States Patent [19]

Ohta

[11] 4,108,116
[45] Aug. 22, 1978

[54] COMBUSTION CHAMBER AND NOZZLE ARRANGEMENT FOR DIRECT FUEL INJECTION TYPE DIESEL ENGINE

[75] Inventor: Tadao Ohta, Kawasaki, Japan
[73] Assignee: Isuzu Motors Limited, Tokyo, Japan
[21] Appl. No.: 803,914
[22] Filed: Jun. 6, 1977
[30] Foreign Application Priority Data
  Jun. 9, 1976 [JP] Japan ................................. 51-67265
[51] Int. Cl.$^2$ ................................................. F02B 3/00
[52] U.S. Cl. ................................. 123/32 A; 123/32 R; 123/193 P
[58] Field of Search ................. 123/32 A, 32 R, 193 P
[56] References Cited

U.S. PATENT DOCUMENTS

| 3,083,700 | 4/1963 | Madak et al. ........................ 123/32 A |
| 3,872,841 | 3/1975 | Kimbara et al. ..................... 123/32 A |

Primary Examiner—Samuel W. Engle
Assistant Examiner—S. A. Cangialosi
Attorney, Agent, or Firm—Sughrue, Rothwell, Mion, Zinn and Macpeak

[57] ABSTRACT

A quadrangular combustion cavity V in the crown of a diesel engine piston is offset from the center thereof, and the position of the fuel injector nozzle is also offset relative to the center of the cavity to accomodate enlarged intake and exhaust valves. The rotational orientation of the nozzle and cavity are geometrically determined such that:
  a. the fuel distances $J_1$, $J_2$ and $J_3$, $J_4$ are equal,
  b. the angles between a line A connecting the geometric center $C_1$ of the cavity and the center $C_2$ of the nozzle, and fuel jet directions $J_1$ and $J_2$ are equal, as are the angles between line A and fuel jet directions $J_3$ and $J_4$, and
  c. the difference between the maximum jet distance $J_1$ and the minimum jet distance $J_3$ is minimized The distances from the four fuel impingement points $Z_1$ - $Z_4$ on the side walls of the cavity to the respective corners of the cavity are also equal.

1 Claim, 3 Drawing Figures

COMBUSTION CHAMBER AND NOZZLE ARRANGEMENT FOR DIRECT FUEL INJECTION TYPE DIESEL ENGINE

BACKGROUND OF THE INVENTION

This invention relates to a diesel engine wherein an injection nozzle tip is offset from the center of an offset quadrangular cavity formed in the crown of a piston.

In U.S. Pat. No. 3,872,841, assigned to the assignee of the present invention, the power output and the exhaust emission of a diesel engine are improved by obliquely directing fuel jets to the respective inside walls of a quadrangular cavity formed in the piston crown, and the engine according to this patent has been recognized as yielding very satisfactory performance characteristics. In the course of such development it has been found that the fuel impingement points at the respective side walls of the cavity, the fuel impingement angles, and the fuel travel distances from the nozzle orifices to the cavity walls are extremely important factors in improving engine output and exhaust emissions.

In the combustion chamber of the above patent the central axis of the quadrangular cavity $V'''$, as shown by a solid line in FIG. 1, coincides with the center of the piston P, and the fuel injection nozzle N is positioned at the center C of the piston. The fuel jets $J_1''$ to $J_4''$ simultaneously and symmetrically impinge on the cavity walls at predetermined points $Z_1''$ to $Z_4''$. Thus, the areas between adjacent fuel jets are uniform and each of the jets is uniformly diffused in the cavity with the same amount of air between adjacent jets, whereby uniform air-fuel mixture and efficient combustion is obtained.

In a small, high speed engine having a high output, however, the intake valve K and exhaust valve H must be enlarged to obtain high intake and exhaust efficiency, whereby the cavity $V'''$ must be offset from the center of the piston in view of air turbulence effects, as shown by the dotted lines in FIG. 1. If the intake and exhaust valves are enlarged, however, it becomes impossible to position the injection nozzle at the center of the piston. The nozzle N must therefore be offset from the center $C_1$ of the offset cavity to point $C_2$ in order to obtain enough space to mount the nozzle. That is, if the intake and exhaust valves are enlarged the remaining space in the cylinder head is reduced, and the position of the injection nozzle must therefore be changed from $C_1$ to $C_2$.

Such nozzle disposition results in unequal fuel impingement lengths and different air spaces between adjacent jets, however, whereby the fuel distribution and uniformity of the air-fuel mixture is degraded, resulting in poorer combustion characteristics. More specifically, the positions of $C_1$ and $C_2$ are determined in accordance with various engine operating conditions, and the fuel impingement points $Z_1'$ to $Z_4'$ are thus fixed. The distances between the imaginary points $a$ to $d$ defined by the corner intersections of the cavity side wall extensions and the points $Z_1'$ to $Z_4'$ are made equal to each other, and the four injection nozzle orifices are directed to impinge the fuel jets $J_1'$ to $J_4'$ at points $Z_1'$ to $Z_4'$. With this arrangement the maximum length fuel jet $J_1'$ is much longer than the minimum length fuel jet $J_3'$, however, which degrades the air-fuel mixture characteristics.

SUMMARY OF THE INVENTION

It is therefore an object of the present invention to overcome the above-mentioned drawbacks and to provide an improved combustion chamber and nozzle orientation which minimizes the fuel impingement length differences from a geometrical stand point. Briefly, and in accordance with the present invention, a quadrangular combustion cavity V in the crown of a diesel engine piston is offset from the center thereof, and the position of the fuel injector nozzle is also offset relative to the center of the cavity to accomodate enlarged intake and exhaust valves. The rotational orientation of the nozzle and cavity are geometrically determined such that:

a. the two longest and the two shortest fuel jet distances are equal in length, b. a line connecting the geometric center of the cavity and the center of the nozzle bisects the angles between the two longest and the two shortest fuel jet directions, and c. the difference between the lengths of the longest and shortest fuel jet distances is minimized.

As in the prior art, the distances from the four fuel impingement points on the side walls of the cavity to the respective cornners of the cavity are equal.

This arrangement optimizes the fuel distribution and combustion characteristics, given the structural necessity of offsetting both the cavity and the injector nozzle.

DETAILED DESCRIPTION OF THE PREFERRED EMBODIMENTS

According to the present invention the differences between the fuel impingement lengths, particularly between jets $J_1'$, and $J_3'$, are minimized by a geometric technique as described below.

Figure 1:
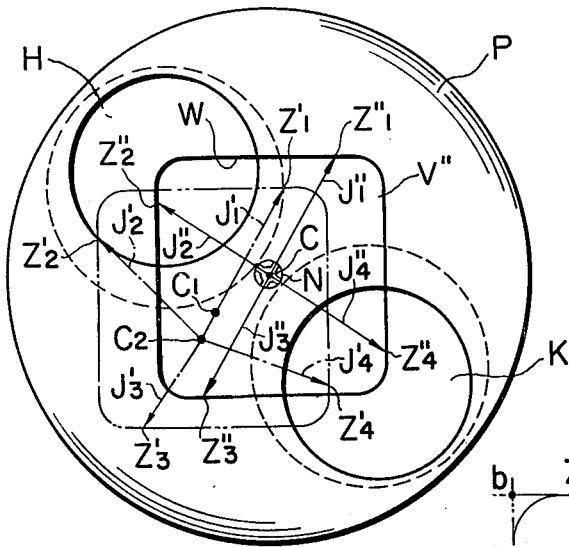
FIG. 1 shows the lay-out of the prior art combustion chamber as viewed from the cylinder head and facing the piston.
Figure 2:
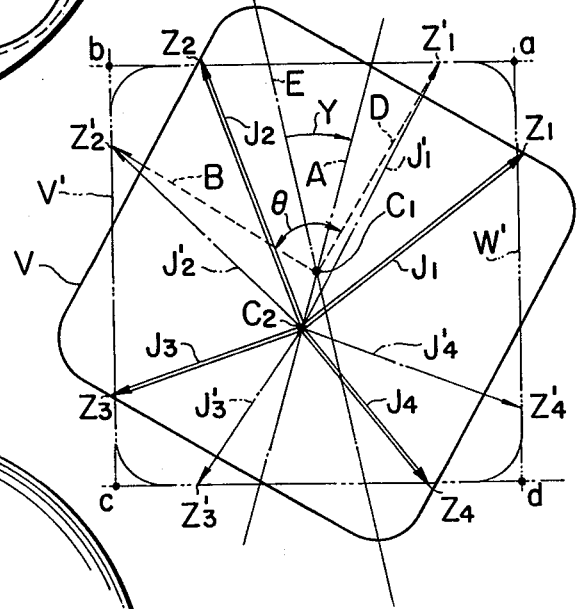
FIG. 2 illustrates a geometric technique for minimizing the differences between the fuel impingement lengths in accordance with the present invention.

First, a line A is drawn in FIG. 2 connecting the geometric center $C_1$ of the imaginary cavity $V'$ and the center $C_2$ of the fuel injection nozzle, as shown by a double dotted chain line.

Second, broken lines D and B are drawn connecting $C_1$ with $Z_1'$ and $Z_2'$, respectively.

Third, bisector line E of the angle $\theta$ between lines B and D is drawn.

Fourth, the imaginary cavity $V'$ is rotated clockwise through an angle Y about point $C_1$ to superimpose line E on line A, thus obtaining a cavity orientation V as shown by the solid line.

Figure 3:
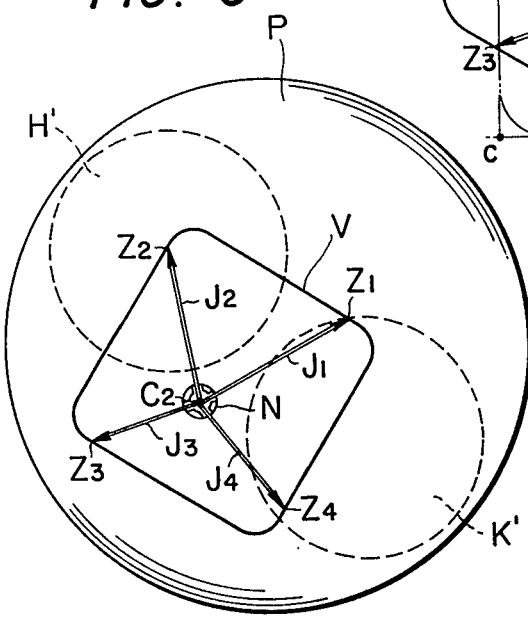
FIG. 3 shows a top view of a piston according to the present invention.

Now if the nozzle center $C_2$ was positioned on the bisector line E, the fuel injection distances from $C_2$ to $Z_1'$ and from $C_2$ to $Z_2'$ would obviously be equal. Since the position of point $C_2$ is predetermined by combustion chamber and valve dimensions as well as fuel mixture flow parameters, however, the imaginary cavity is instead rotated through the angle Y about point $C_1$. The injector nozzle is then similarly rotated such that the respective fuel jets $J_1$ to $J_4$ are directed at points $Z_1$ to $Z_4$, which correspond to $Z_1'$ to $Z_4'$ of cavity $V'$, respectively, resulting in a cavity orientation and fuel jet directions as shown in FIG. 3.

With this arrangement the jets $J_1$, $J_2$ and $J_3$, $J_4$ are symmetrical with respect to line A and equal in length. That is, $J_1 = J_2$ and $J_3 = J_4$. Furthermore, the maximum length $J_1'$ is reduced to $J_1$ and the minimum length $J_3'$ is increased to $J_3$, whereby the difference between the impingement distances $J_1$ and $J_3$ is minimized. This may easily be visualized by observing that if the cavity is rotated more than angle Y, $J_1$ will continue to decrease and $J_3$ will continue to increase, but now $J_2$ becomes the longest distance and continues to increase while $J_4$ becomes the shortest distance and continues to decrease.

What is claimed is:

1. In a diesel engine including a cylinder, a cylinder head, a piston slidably disposed in the cylinder and having a quandrangular cavity in its crown offset from the center of the piston, and a fuel injector nozzle disposed in the cylinder head and offset with respect to the center of the cavity for injecting four jets of fuel directed at points on the respective side walls of the cavity equidistant from the adjacent corners thereof, the improvement characterized by the rotational orientation of the cavity being such that:
    a. the two longest and the two shortest fuel jet distances are equal in length,
    b. a line connecting the geometric center of the cavity and the center of the nozzle bisects the angles between the two longest and the two shortest fuel jet directions, and
    c. the difference between the lengths of the longest and shortest fuel jet distances is minimized.

* * * * *